United States Patent
Kuribayashi et al.

[11] Patent Number: 6,086,265
[45] Date of Patent: Jul. 11, 2000

[54] FIBER-DETACHABLE-TYPE OPTICAL MODULE

[75] Inventors: Masaki Kuribayashi; Kazuhiko Kobayashi; Shunichi Satoh, all of Sapporo; Hironao Hakogi, Kawasaki, all of Japan

[73] Assignee: Fujitsu Limited, Kawasaki, Japan

[21] Appl. No.: 09/050,418

[22] Filed: Mar. 31, 1998

Related U.S. Application Data

[62] Division of application No. 08/791,958, Jul. 21, 1998, Pat. No. 5,784,513.

[51] Int. Cl.[7] .................................................. G02B 6/36
[52] U.S. Cl. ................................. 385/92; 385/89; 385/90; 385/91
[58] Field of Search .................................. 385/88–94

[56] References Cited

U.S. PATENT DOCUMENTS

| | | | |
|---|---|---|---|
| 5,295,214 | 3/1994 | Card et al. | 385/92 |
| 5,594,826 | 1/1997 | Wood et al. | 385/88 |
| 5,596,665 | 1/1997 | Kurashima et al. | 385/92 |
| 5,604,831 | 2/1997 | Dittman et al. | 385/88 |
| 5,802,230 | 9/1998 | Kuribayashi et al. | 385/92 |
| 5,852,695 | 12/1998 | Elliman et al. | 385/82 |

FOREIGN PATENT DOCUMENTS

1-169416  7/1989  Japan.

*Primary Examiner*—Hung N. Ngo
*Attorney, Agent, or Firm*—Staas & Halsey LLP

[57] ABSTRACT

An optical module has a module case in which an optical device and a circuit unit electrically connected to the optical device are mounted. An optical connector of an optical fiber is detachably connected to the module case so as to be in contact with the optical device. The optical module includes a supporting structure supporting the optical device in a state in which the optical device is movable along a line, a force applying mechanism applying a force to the optical device in a direction parallel to the line along which the optical device is movable, and a locking mechanism releasably locking the optical connector pressing the optical device in a direction parallel to the line so as to be in close contact with the optical device, light passing through a boundary between the optical connector and the optical device.

2 Claims, 13 Drawing Sheets

FIBER-DETACHABLE-TYPE OPTICAL MODULE

CROSS-REFERENCE TO RELATED APPLICATION

This is a divisional application of prior application Ser. No. 08/791,958, now U.S. Pat. No. 5,784,513, issued Jul. 21, 1998, of which this application claims priority under 35 U.S.C. §120.

BACKGROUND OF THE INVENTION (1) Field of the Invention

The present invention generally relates to a fiber-detachable-type optical module, and more particularly to an optical module, including an optical device, in which an optical fiber connected thereto is detachable therefrom.

(2) Description of the Related Art

An optical module is provided with an optical fiber, an optical semiconductor device and a printed circuit board on which circuitry processing electric signals is formed. The optical semiconductor device may include a laser diode (LD) for converting electric signals into optical signals and a photo diode (PD) for converting optical signals into electric signals. The optical module is employed for optical communication (optical transmission and/or reception).

In a process for soldering pins of the circuit board of the optical module on a board, a flow-soldering method is advantageous in that the number of working steps can be reduced. However, since the optical fiber is covered with a high polymer weak in heat, such as polyethylene, the flow-soldering method cannot be used for the optical module to which the optical fiber is connected.

Thus, the flow-soldering method is applied to the optical module under a condition in which the optical fiber is detached from the optical module. After the optical module is soldered on a board by using the flow-soldering method, the optical fiber is connected to the optical module.

The optical module from which the optical fiber can be detached as described above is referred to as a fiber-detachable-type optical module.

Figure 1A:
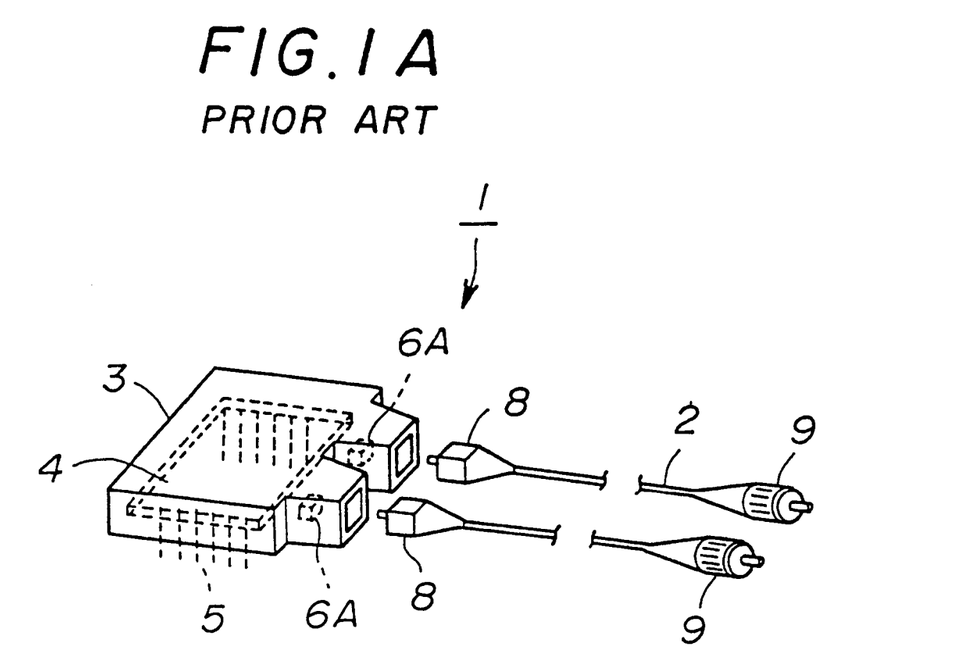
FIG. 1A is a diagram illustrating the exterior of a conventional fiber-detachable-type optical module.
Figure 1B:
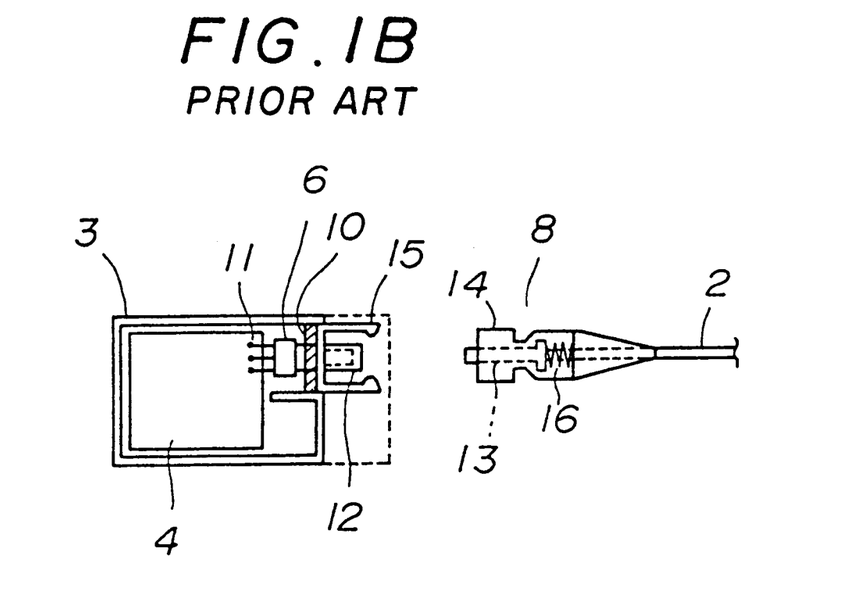
FIG. 1B is a diagram illustrating internal structures of a module body and an optical connector mounted at the end of the optical fiber of the conventional optical module of FIG. 1A.

A conventional fiber-detachable-type optical module is formed as shown in FIGS. 1A and 1B.

Referring to FIG. 1A, an optical module is provided with a module body 3 and optical fibers 2. A printed circuit board 4 is mounted in the module body 3. The printed circuit board 4 has lead pins 5 through which signals are output from and input to the printed circuit board 4 and electric power is supplied to the printed circuit board 4. Optical elements 6A such as the laser diode (LD) and the photo diode (PD) are mounted in the module body 3.

Each of the optical fibers 2 is provided with optical connectors 8 and 9 at respective ends. One optical connector 8 is connected to the module body 3 so that optical signals travel between the optical fiber 2 and the optical element 6A through the optical connector 8. The other optical connector 9 of each of the optical fiber 2 is connected to an external unit so that optical signals travel between the optical fiber 2 and the external unit through the optical connector 9.

FIG. 1B shows internal structures of the module body 3 and the optical connector 8 of the optical fiber 2.

Referring to FIG. 1B, in the module body 3, the printed circuit board 4 is fixed and an optical device 6 including one of the optical elements 6A is rigidly fixed by means of potting 10 (or molding). Lead terminals of the optical device 6 are soldered on the printed circuit board 4. The optical device 6 is connected with a ferrule 12 supporting an end portion of an optical fiber coupled to the optical device 6.

The optical connector 8 has a ferrule 13 supporting an end portion of the optical fiber 2. An insertion portion 14 through which the ferrule 13 freely passes is inserted in and engaged with an engaging portion 15 of the module body 3, so that the ends of the ferrules 12 and 13 are in rigid contact with each other. The optical device 6 transmits and receives optical signals to and from the optical fiber 2 via the ferrules 12 and 13.

The ferrule 13 of the optical connector 8 is elastically supported by a spring 16 in a direction in which the ferrule 13 extends. As a result, when the optical connector 8 is connected to the module body 3, an impact stress generated in the ferrules 12 and 13 is softened. Thus, the end surfaces of the respective ferrules 12 and 13 are prevented from being broken by the impact stress.

However, for example, in cases of assembling the optical module 1, testing the optical module 1 and the like, after the optical fiber 2 is connected to the module body 3, the optical fiber 2 may be pulled. At this time, due to the repulsion of the spring 16 elastically supporting the ferrule 13 of the optical connector 8, the ferrule 13 may come into collision with the ferrule 12 in the module body 3 with a large impact. If the collision between the ferrules 12 and 13 is repeated, the end surface of the optical fiber 2 may be damaged, so that the optical transmission loss is increased and a state in which light is reflected on the end surface of the optical fiber 2 is changed.

SUMMARY OF THE INVENTION

Accordingly, a general object of the present invention is to provide a novel and useful fiber-detachable-type optical module in which the disadvantages of the aforementioned prior art are eliminated.

A specific object of the present invention is to provide a fiber-detachable-type optical module in which even if a detachable optical fiber is pulled, the end surface of the optical fiber is not damaged.

The objects of the present invention are achieved by an optical module having a module case in which an optical device and a circuit unit electrically connected to the optical device are mounted, an optical connector of an optical fiber being detachably connected to the module case so as to be in contact with the optical device, the optical module comprising: a supporting structure for supporting the optical device in a state where the optical device is movable along a line; a force applying mechanism for applying a force to the optical device in a direction parallel to the line along which the optical device is movable; and a locking mechanism for releasably locking the optical connector pressing the optical device in a direction parallel to the line so as to be in close contact with the optical device, wherein light passes through a boundary between the optical connector and the optical device.

According to the present invention, the optical device is movably supported and a force is applied to the optical device, in the module case. Thus, the optical fiber which is in contact with the optical device can be fixed to the optical connector. As a result, even if the optical fiber is pulled, the end surface of the optical fiber is not damaged.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of an embodiment of the present invention.

Figure 2:
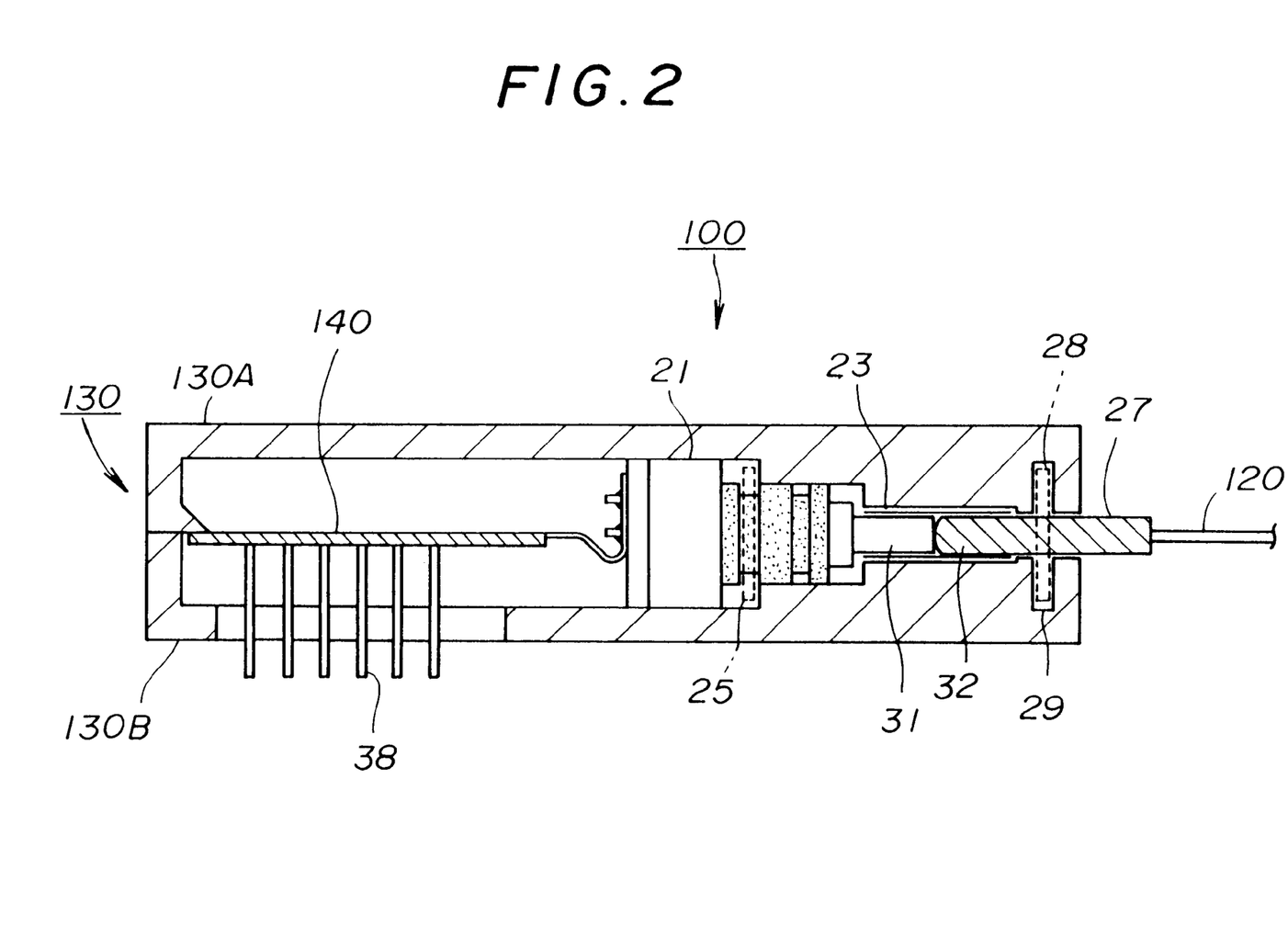
FIG. 2 is a cross sectional view illustrating a fiber-detachable-type optical module according to an embodiment of the present invention.
Figure 3A:
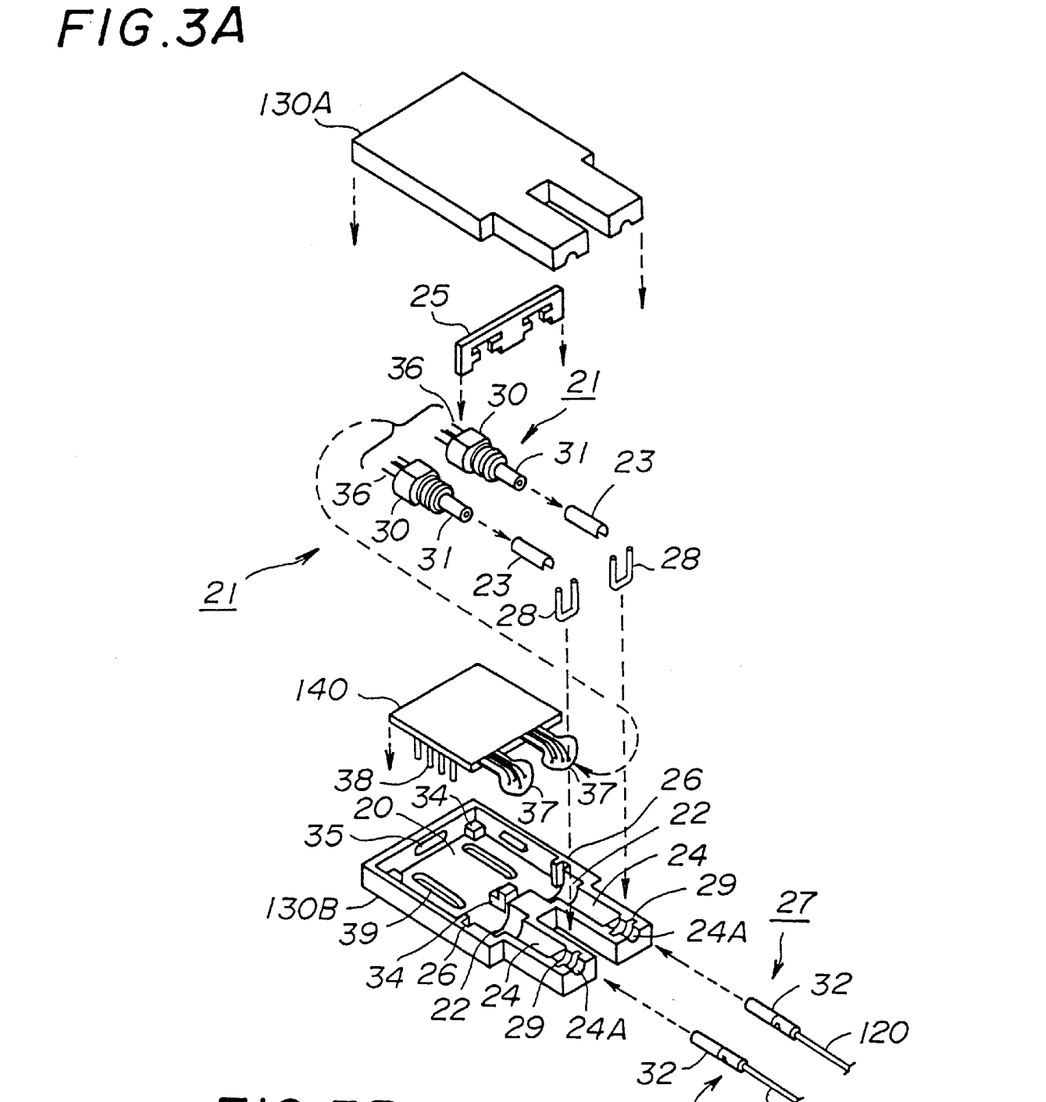
FIG. 3A is an exploded perspective view illustrating the fiber-detachable-type optical module of FIG. 2.

A fiber-detachable-type optical module according to the embodiment is formed as shown in FIGS. 2 and 3A. Referring to FIG. 3A, an upper module case 130A and a lower module case 130B are made, for example, of PBT (polybutylene terephthalate) by a resin molding process. Inside each of the upper and lower module cases 130A and 130B, a first concave portion 20, second concave portions 22, third concave portions 24, press-in portions 26, fourth concave portions 24A and pin-fixing portions 29 are formed.

Figure 3B:
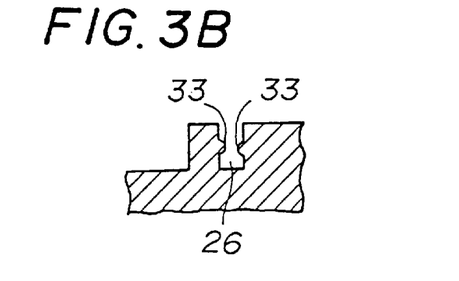
FIG. 3B is a cross sectional view illustrating a structure of a press-in portion of a module case of the optical module of FIG. 3A.

In the lower module case 130B, a printed circuit board 140 is set in the first concave portion 20 and both ends of a leaf spring 25 which holds optical semiconductor units 21 are pressed into the press-in portions 26 so that holder portions 30 of the respective optical semiconductor units 21 are set in the second concave portions 22. An assembly in which a ferrule 31 of each of the optical semiconductor units 21 and a ferrule 32 of each of optical connectors 27 are inserted in a slit sleeve 23 is set in the third concave portion 24. As shown in FIG. 3B, bosses 33 may be formed on inside surfaces of the press-in portion 26. In this case, the leaf spring 25 can be tightly pressed into the press-in portion 26.

The upper module case 130A is put in and fixed to the lower module case 130B so that the printed circuit board 140, the optical semiconductor units 21 held by the leaf spring 25 and the like are mounted inside an assembled module body 130 formed of the upper and lower cases 130A and 130B, as shown in FIG. 2. In a state where the optical semiconductor units 21 are mounted in the module body 130, the optical semiconductor units 21 can slide on the surfaces of the second concave portions 22 of the upper and lower module cases 130A and 130B. The leaf spring 25 applies a force to the optical semiconductor units 21, so that the end surfaces of the ferrules 31 and 32 are in close contact with each other.

The printed circuit board 140 is supported by supporting blocks 34 formed in the lower module case 130B and pressed against the supporting blocks 34 by a nail 35 of the upper module case 130A, so that the printed circuit board 140 is fixed. Terminals 36 of the optical semiconductor units 21 are electrically connected to the printed circuit board 140 via flexible printed circuit (FPC) boards 37.

Each of the optical connectors 27 is clamped by a pin 28 inserted in the pin-fixing portion 29. As a result, each of the optical connector 27 is prevented from being shaky (i.e., loose and moveable) in the forth concave portions 24A of the upper and lower module cases 130A and 130B.

In this embodiment, one of the optical semiconductor units 21 (having an LD) is used to transmit optical signals and another (having a PD) is used to receive optical signals. The optical module 100 may be provided with only a single optical semiconductor unit used to either transmit or receive optical signals. Lead pins 38 of the printed circuit board 140 project from the lower module case 130B through an opening 39. The lead pins 38 are connected to external units (e.g., a power supply unit, a control unit and the like).

A further detailed description will now be given of a structure of the fiber detached type optical module.

Figure 4:
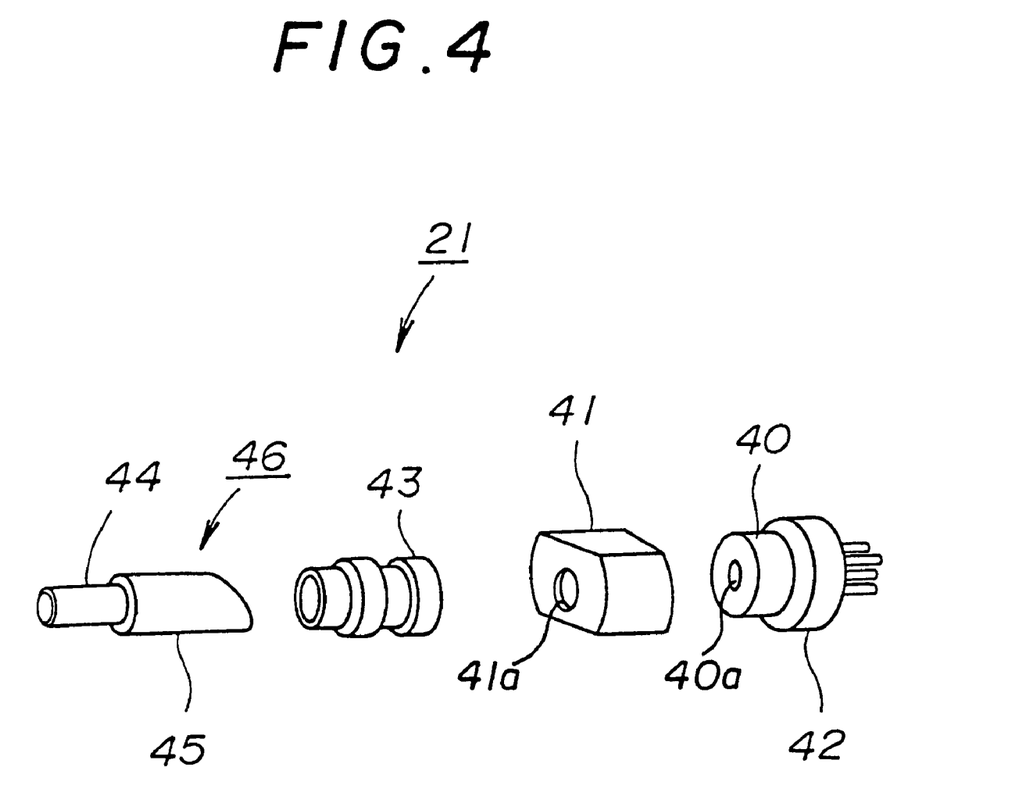
FIG. 4 is an exploded perspective view illustrating an optical semiconductor unit which is mounted in a module case of the optical module of FIG. 3A.

Each of the optical semiconductor units 21 is formed as shown in FIG. 4. Referring to FIG. 4, an optical semiconductor element (the LD or the PD) is mounted in a package 40. The package 40 has a hole 40a with a lens through which a light beam passes. The package 40 is set in a cylindrical holder 41 made of stainless steel (e.g., SUS304). The cylindrical holder 41 is closed at a first end and opened at a second end. A hole 41a through which a light beam passes is formed on the first end surface of the cylindrical holder 41. The edge of the second end of the cylindrical holder 41 is fixed on a base 42 of the package 40 by ring-projection welding.

An end edge of a sleeve 43 made of stainless steel (e.g., SUS304) is fixed around the hole on the cylindrical holder 41 by fillet welding. A ferrule assembly 46 in which a zirconia-ferrule 44 is pressed into a metal cylinder 45 is inserted in the sleeve 43. The metal cylinder 45 which is made of stainless steel (e.g., SUS304) is inserted and fixed in the sleeve 43 by laser beam welding. The optical fiber runs in the middle of the zirconia-ferrule 44. The zirconia-ferrule 44 corresponds to the ferrule 31 shown in FIGS. 2 and 3A.

In the ferrule assembly 46, the end surface of the metal cylinder 45 is diagonally ground and polished so that useless reflected light generated when light travels between the metal cylinder 45 and the package 40 is eliminated. The end surface of the zirconia-ferrule 44 is polished in a PC (Physical Contact) condition so that the transmission efficiency of light traveling between the optical fiber and the optical connector is prevented from being decreased.

Figure 5A:
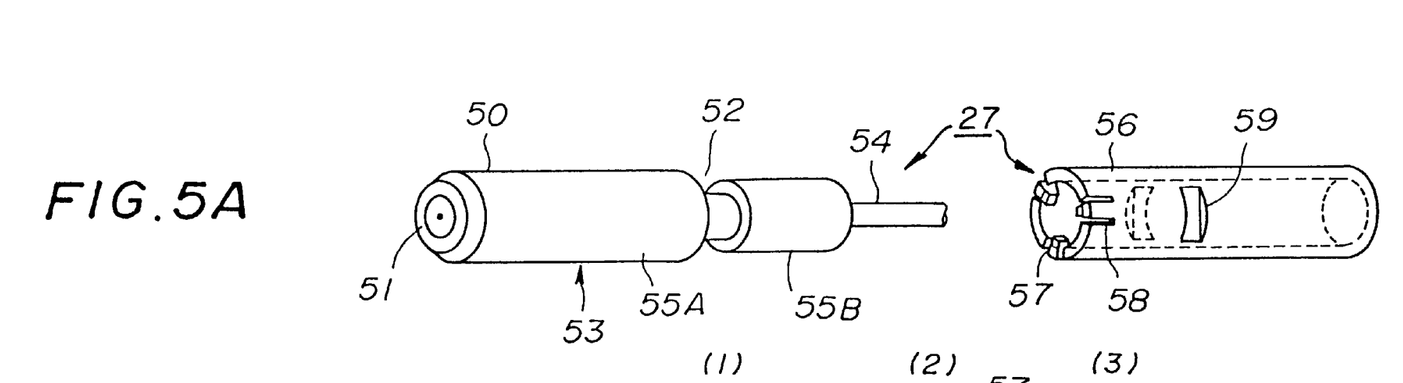
FIG. 5A is a diagram illustrating an exploded view of an optical connector.
Figures 5B, 5C:
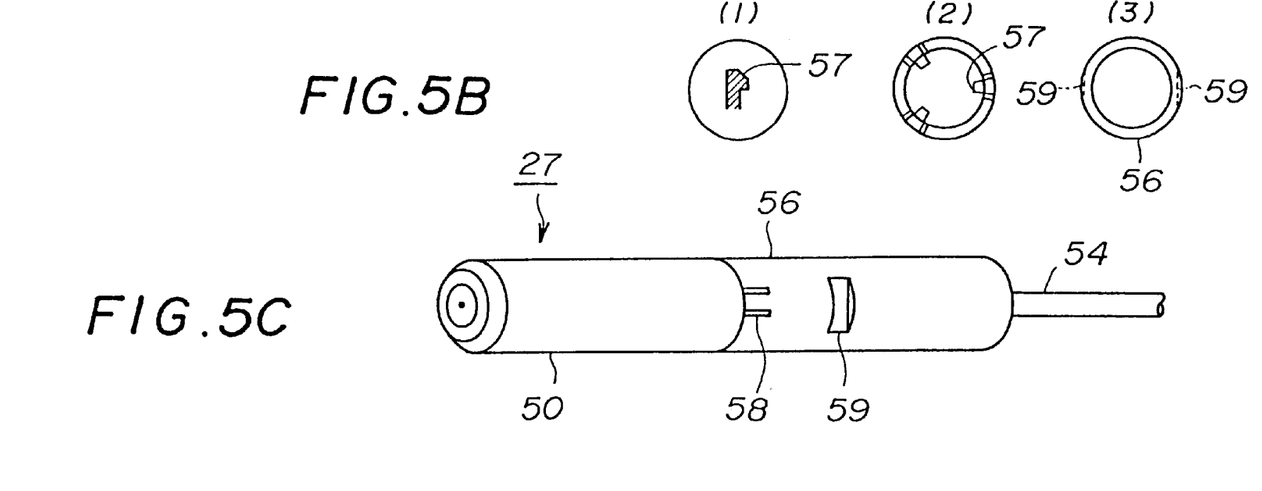
FIG. 5B is diagrams illustrating clicks and grooves formed on a cylinder.
FIG. 5C is a diagram illustrating an assembled view of the optical connector.

Each of the optical connectors 27 is formed as shown in FIGS. 5A, 5B and 5C. FIG. 5A is an exploded view of the optical connector and FIG. 5C is an assembled view of the optical connector. Referring to FIG. 5A, a ferrule 50 (a fixing unit) is formed of a cylindrical ceramic-capillary 51 and a metal cylinder 53. The ceramic-capillary 51 includes the optical fiber in the middle thereof. The metal cylinder 53 is made of stainless steel (e.g., SUS304). A ring-shaped groove 52 is formed at a predetermined position on the metal cylinder 53 so that the metal cylinder 53 is divided into a connecting side portion 55A and an optical fiber side portion 55B. The outer diameter of the optical fiber side portion 55B is less than the outer diameter of the connecting side portion 55A.

A cylinder 56 (a rotatable unit) which is made of resin such as PBT has an inner diameter corresponding to the outer diameter of the optical fiber side portion 55B of the metal cylinder 53. At an end of the cylinder 56, a plurality of clicks 57 projecting radially inwardly from the inner surface of the cylinder 56 are formed (see FIG. 5B(2)). Each of the clicks 57 has a cross sectional shape as shown in FIG. 5B(1). Slits 58 extending from the base of each of the clicks 57 are formed on the wall of the cylinder 56 so that each of the clicks 57 can move outwardly. Grooves 59 which are in parallel with each other are formed on the wall of the cylinder 56 (see FIG. 5B(3)). The grooves 59 extend in a direction perpendicular to the axis of the cylinder 56. The width of each of the grooves 59 is slightly greater than the diameter of the pin 28 (see FIGS. 2 and 3A).

The optical fiber side portion 55B of the ferrule 50 is pushed into the cylinder 56, so that the clicks 57 of the cylinder 56 are spread. When the clicks 57 reach the ring-shaped groove 52, the clicks 57 return from the spread state and protrude into and thereby are engaged in the ring-shaped groove 52. As a result, the cylinder 56 is integrated with the ferrule 50, and an assembly as shown in FIG. 5C is completed. Since the clicks 57 are engaged in the ring-shaped groove 52, even if the cylinder 56 is pulled, the cylinder 56 and the ferruled 50 are not separated from each other. Thus, the optical connector 27 as shown in FIG. 3A is constituted. In the optical connector 27, the cylinder 56 can be freely rotated coaxially to the ferrule 50.

Figure 6A:
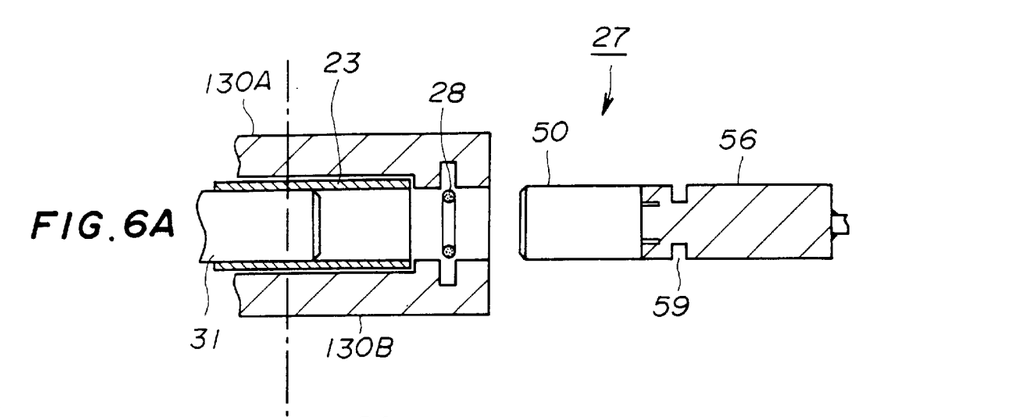
FIGS. 6A, 6B and 6C are diagrams illustrating a procedure for setting the optical connector in the module case and detaching the optical connector therefrom.
Figure 6B:
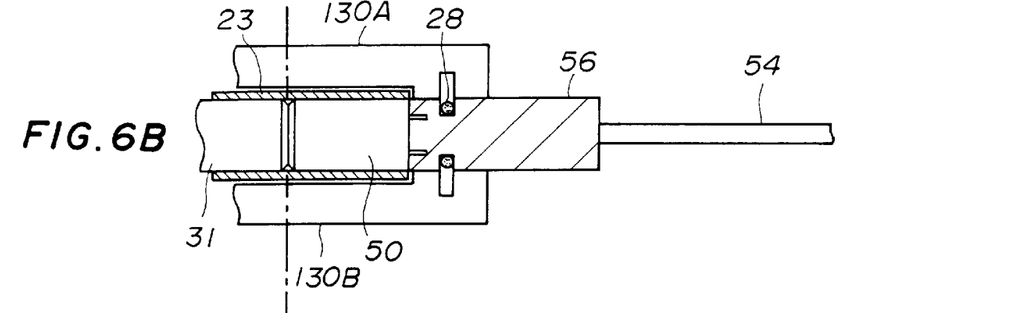
Figure 6C:
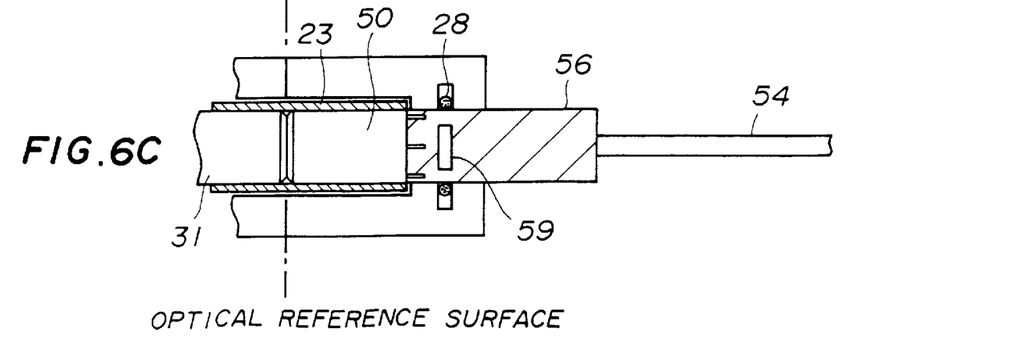

The optical connector 27 is inserted into and detached from the module body 130 (formed of the upper and lower module cases 130A and 130B) in accordance with steps as shown in FIGS. 6A, 6B and 6C.

The optical connector 27 approaches the module body 130 (see FIG. 6A) and is inserted into the module body 130. While being inserted into the module body 130, the leading end of the optical connector 27 hits on the pin 28 first. When the optical connector 27 is further inserted, the pin 28 is spread and the leading end of the ferrule 50 of the optical connector 27 passes through a position at which the pin 28 is located and reaches the slit sleeve 23. The ferrule 50 is then inserted into the slit sleeve 23. When the optical connector 27 is further inserted, the pin 28 is engaged in the grooves 59 formed on the cylinder 56 of the optical connector 27 (see FIG. 6B). As a result, the optical connector 27 is fixed in the module body 130.

In the state where the optical connector 27 is fixed in the module body 130, the optical connector 27 slightly pushes the optical semiconductor unit 21 toward the printed circuit board 140 (see FIGS. 6A and 6B), so that the end surface of the ferrule 31 of the optical semiconductor unit 21 is pressed against the end surface of the ferrule 50 of the optical connector 27 by the repulsive power of the leaf spring 25 (see FIG. 3A). As a result, the end surfaces of the ferrules 31 and 50 are in close contact with each other so as to be in a PC (Physical Contact) state.

The cylinder 56 is rotated to detach the optical connector 27 from the module body 130. Due to the rotation of the cylinder 56, the pin 28 is removed from the grooves 59 and spread by the surface of the cylinder 56 (see FIG. 6C). As a result, the optical connector 27 is released from the module body 130 so as to be brought into a state where the optical connector 27 can be pulled from the module body 130.

The slit sleeve 23 engages and thereby fastens the ferrule 50 thereto with a force (e.g., 500 gf). Thus, even if the cylinder is rotated to detach the optical connector 27 from the module body 130, the ferrule 50 is not rotated. Accordingly, when the optical connector 27 is detached from the module body 130, the end surfaces of the optical fibers supported by the ferrules 31 and 50 are not damaged.

The pin (28) used to fix the optical connector 27 in the module body 130 may be formed as shown in each set of FIGS. 7A and 7B, FIGS. 8A and 8B and FIGS. 9A and 9B.

Figure 7A:
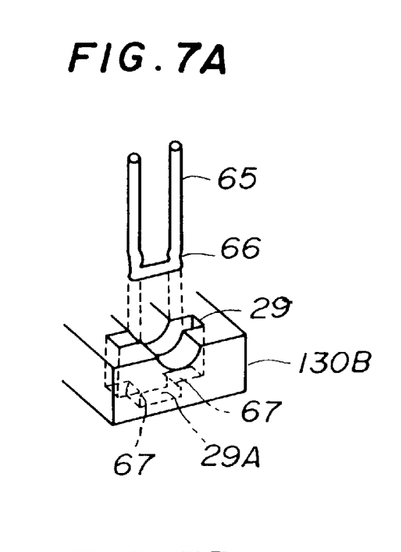
FIGS. 7A, 7B, 8A, 8B, 9A and 9B are diagrams illustrating examples of pins and structures in which the pins are mounted.
Figure 7B:
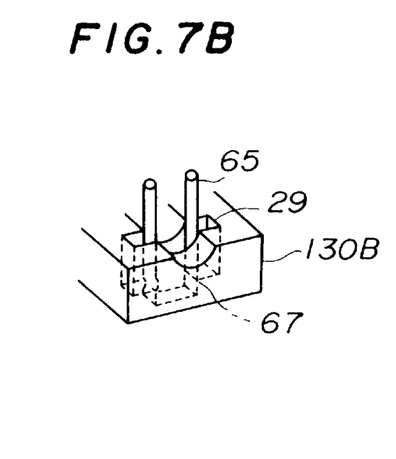

In an example shown in FIGS. 7A and 7B, a U-shaped pin 65 is used. As shown in FIG. 7A, both sides of a root portion of the U-shaped pin 65 are partially bent inside, so that bent portions 66 are formed. A space 29A in which the root portion of the U-shaped pin 65 is to be fitted is formed on a bottom of the pin-fixing portion 29. Projections 67 are formed on the wall of the pin-fixing portion 29 so as to be engaged in the bent portions 66 of the U-shaped pin 65 fitted in the space 29A. The upper surface of each of the projections 67 is inclined, so that the U-shaped pin 65 can be easily set in the space 29A but is not easily detached from the space 29A.

The root portion of the U-shaped pin 65 is pressed into the space 29A, and the bent portions 66 of the U-shaped pin 65 are engaged with the projections 67, as shown in FIG. 7B. As a result, the U-shaped pin 65 is prevented from being pulled out of the pin-fixing portion 29.

Figure 8A:
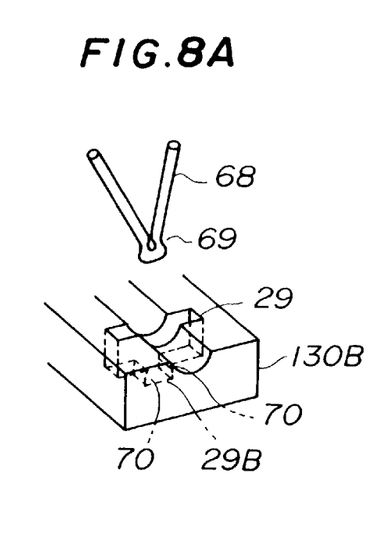
Figure 8B:
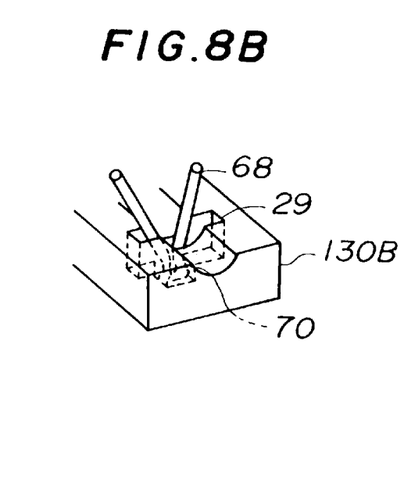

In an example shown in FIGS. 8A and 8B, a V-shaped pin 68 is used. As shown in FIG. 8A, both sides of a root portion of the V-shaped pin 68 are partially bent, so that bet portions 69 are formed. A space 29B in which the root portion of the V-shaped pin 68 is to be fitted is formed on a bottom of the pin-fixing portion 29. Projections 70 are formed on the wall of the pin-fixing portion 29 so as to be engaged in the bent portions 69 of the V-shaped pin 68 fitted in the space 29B. The upper surface of each of the projections 70 is inclined, so that the V-shaped pin 68 can be easily set in the space 29B but is not easily detached from the space 29B.

The root portion of the V-shaped pin 98 is pressed into the space 29B, and the bent portions 69 are engaged with the projections 70, as shown in FIG. 8B. As a result, the V-shaped pin 68 is prevented from being pulled out of the pin-fixing portion 29.

Figure 9A:
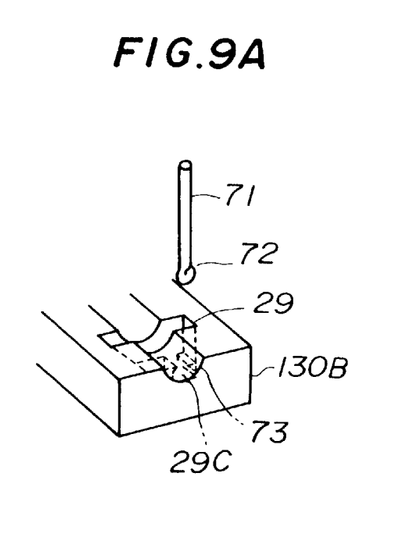
Figure 9B:
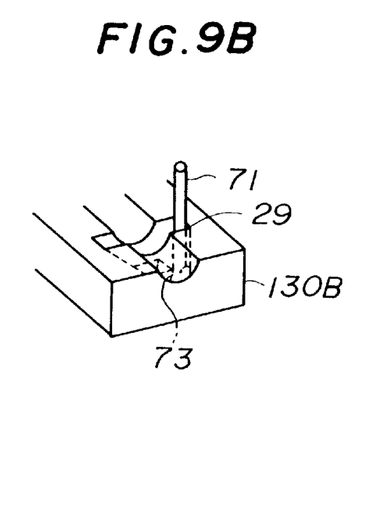

In an example shown in FIGS. 9A and 9B, an I-shaped pin 71 is used, as shown in FIG. 9A, a root portion of the I-shaped pin 71 is bent, so that a bent portion 72 is formed. A space 29C in which the bent portion 72 of the I-shaped pin 71 is to be fitted is formed on a bottom of the pin-fixing portion 29. Projections 73 are formed on the wall of the pin-fixing portion 29 so as to be engaged in a constriction part of the bent portion 72 of the I-shaped pin 71 fitted in the space 29C. The upper surface of the projections 73 is inclined, so that the I-shaped pin 71 can be easily set in the space 29C but not easily detached from the space 29C.

The root portion (the bent portion 72) of the I-shaped pin 71 is pressed into the space 29C, and the constriction part of the bent portion 72 is engaged with the projection 73, as shown in FIG. 9B. As a result, the I-shaped pin 71 is prevented from being pulled out of the pin-fixing portion 29.

Figure 10A:
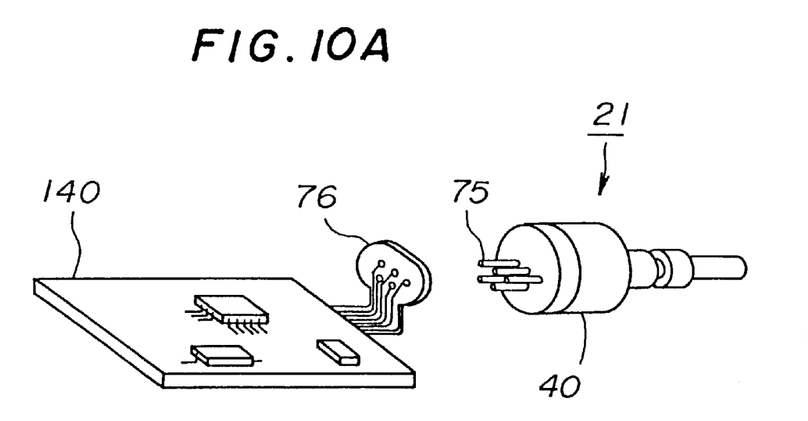
FIGS. 10A, 10B, 11A and 11B are diagrams illustrating examples of structures in which the optical semiconductor unit is supported.
Figure 10B:
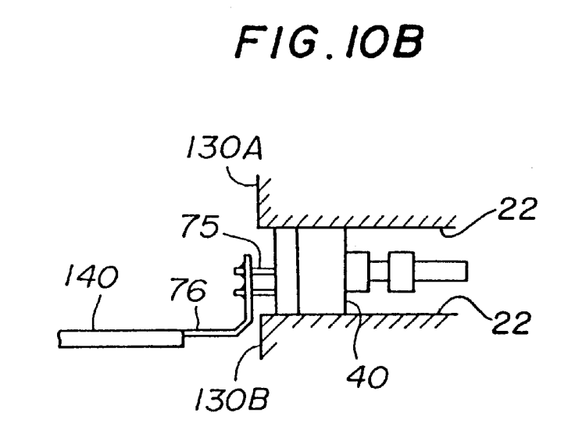

The optical semiconductor unit 21 having lead pins is connected to the printed circuit board 140 and mounted in the module case 130, as shown in FIGS. 10A and 10B. The optical semiconductor unit 21 having a ceramic terminal is connected to the printed circuit board 140 and mounted in the module case 130, as shown in FIGS. 11A and 11B.

Referring to FIG. 10A, a package 40 of the optical semiconductor unit 21 has lead pins 75 which are electrically connected to devices in the package 40. The printed circuit board 140 is provided with a flexible printed circuit board (FPC) 76 on which circuit patterns connected to external terminals of the printed circuit board 140 are formed. The lead pins 75 of the optical semiconductor unit 21 are connected to terminals of the printed circuit patterns formed on the FPC 76.

The package 40 of the optical semiconductor unit 21 is mounted in a space surrounded by concave portions 22 of the upper and lower module cases 130A and 130B, as shown in FIG. 10B. The package 40 is slidable in the space (on the surface of the concave portions 22). The package 40 is connected to the printed circuit board 140 via the FPC 76, so that the movement of the package 40 sliding in the space is absorbed by the FPC 76. Thus, the movement of the package 40 does not affect the printed circuit board 140.

Figure 11A:
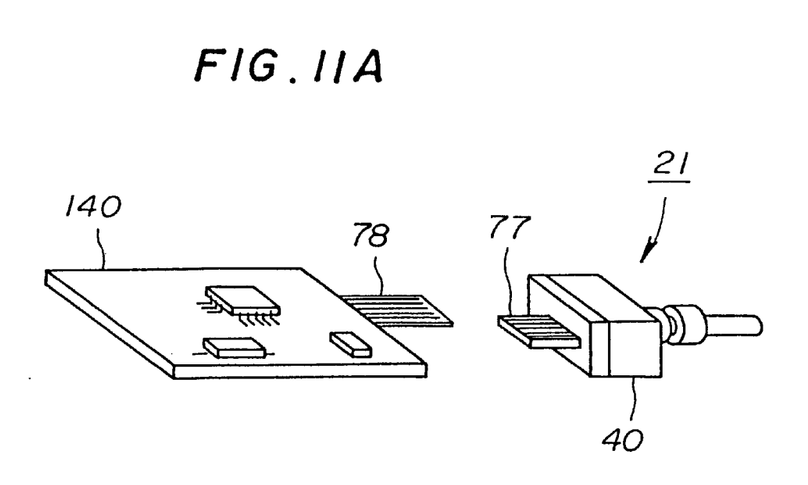
Figure 11B:
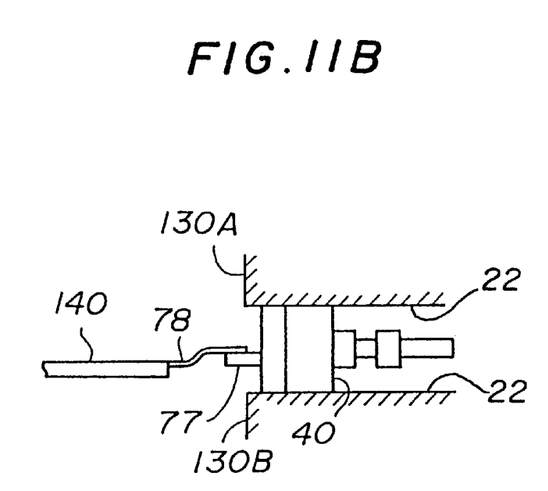

Referring to FIG. 11A, the package 40 of the optical semiconductor unit 21 has a ceramic terminal 77 on which lead patterns electrically connected to devices in the package 40 are formed. The printed circuit board 140 is provided with a flexible printed circuit board (FPC) 78 on which circuit patterns connected to external terminals of the printed circuit board 140 are formed. The lead patterns formed on the ceramic terminal 77 are connected to terminals of the printed circuit patterns formed on the FPC 78.

The package 40 of the optical semiconductor unit 21 is mounted in a space surrounded by concave portions 22 of the upper and lower module cases 130A and 130B, as shown in FIG. 11B. The package 40 is slidable in the space (on the surface of the concave portions 22). In this case also, the package 40 is connected to the printed circuit board 140 via the FPC 78, so that the movement of the package 40 sliding in the space is absorbed by the FPC 78. Thus, the movement of the package 40 does not affect the printed circuit board 140.

Figure 12A:
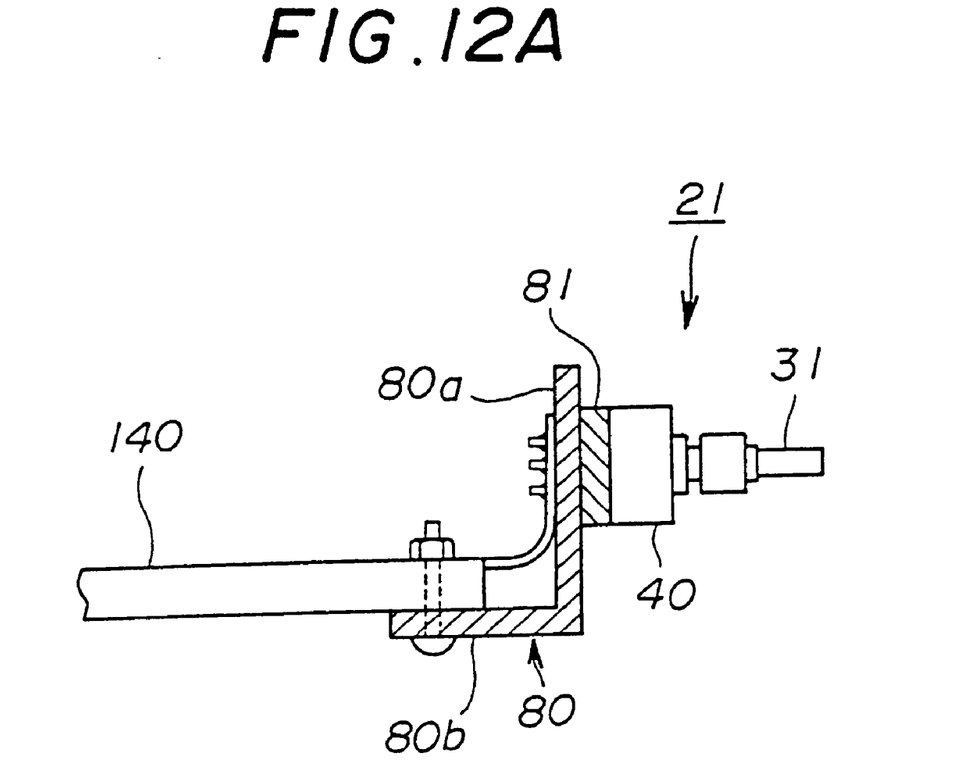
FIG. 12A is a diagram illustrating a structure in which the optical semiconductor unit is supported by an L-shaped leaf spring.

The optical semiconductor unit 21 may also be supported in the module case 130 as shown in FIG. 12A.

Figure 12B:
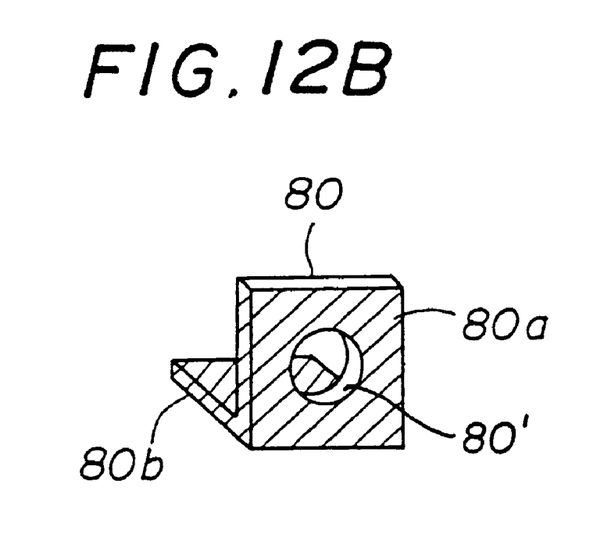
FIG. 12B is a detailed diagram illustrating the L-shaped leaf spring.

Referring to FIG. 12A, the optical semiconductor unit 21 is supported by an L-shaped leaf spring 80 fixed on the printed circuit board 140. The L-shaped leaf spring 80 is formed of a first leaf 80a and a second leaf 80b both of which are perpendicular to each other, as shown in FIG. 12B. A hole 80 is formed in the first leaf 80a of the L-shaped leaf spring 80. An end of the second leaf 80b of the L-shaped leaf 80 is fixed on the printed circuit board 140. The L-shaped leaf spring 80 is made of a material, such as koval steel, which can be attracted by a magnet. A permanent magnet 81 is provided on an end of a stem of the package 40. The package 40 is mounted on the L-shaped leaf spring 80 by the permanent magnet 81 in a state where the stem of the package 40 and the first leaf 80a of the L-shaped leaf spring 80 are in close contact with each other. The leads projecting from the package 40 pass through the hole 80 formed on the first leaf 80a (see FIG. 12B) and are connected to the printed circuit board 140 by the FPC.

As the optical semiconductor unit 21 slidably mounted in the module case 130 is supported by the L-shaped leaf spring 80 as described above, the optical semiconductor unit 21 can softly receive (i.e., resiliently respond to) a force from the optical connector 27 inserted into the module case 130. Further, due to the repulsion force of the L-shaped leaf spring 80, the ferrule 31 of the optical semiconductor unit 21 and the ferrule 50 of the optical connector 27 are in close contact with each other (in the PC contact state).

Figure 13A:
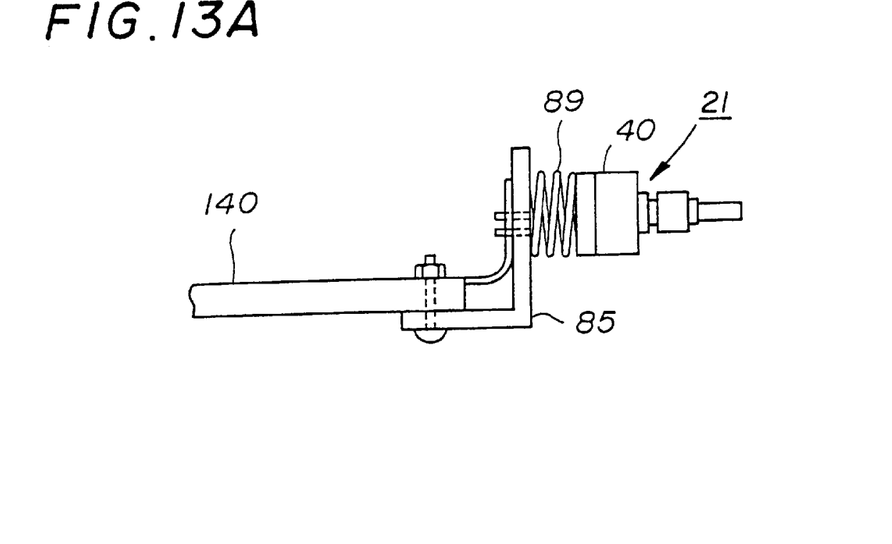
FIG. 13A is a diagram illustrating a structure in which the optical semiconductor unit is supported by using a rigid L-shaped plate (i.e., a bracket)

Further, the optical semiconductor unit 21 may be supported in the module case 130 as shown in FIG. 13A.

Figure 13B:
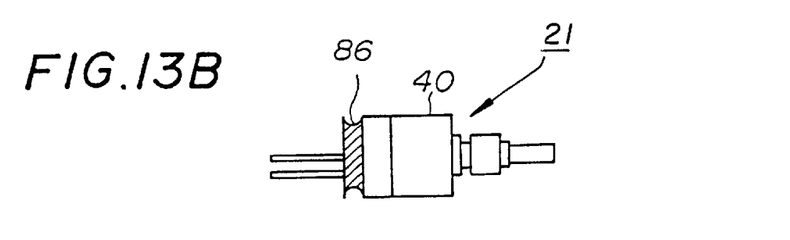
FIG. 13B is a diagram illustrating a structure of a package of the optical semiconductor unit supported by using the rigid L-shaped plate.
Figure 13C:
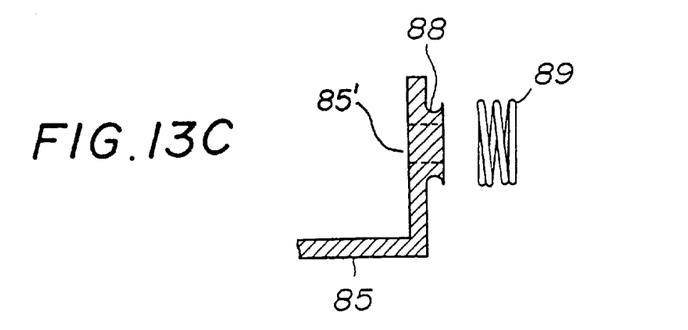
FIG. 13C is a diagram illustrating the rigid L-shaped plate and a coil spring which should be set between the rigid L-shaped plate and the package of the optical semiconductor unit.

Referring to FIG. 13A, the optical semiconductor unit 21 is supported by using an L-shaped plate 85 (a bracket). The L-shaped plate 85 has the same shape as the L-shaped leaf spring 80 shown in FIG. 12B but is rigid. The L-shaped plate 85 is fixed on the printed circuit board 140 in the same manner as in the case shown in FIG. 12A. As shown in FIG. 13B, a first spring stopper 86 is formed on the end of the stem of the package 40. The first spring stopper 86 is shaped into a ring having a constricted outer surface. In addition, as shown in FIG. 13C, a second spring stopper 88 is formed on the L-shaped plate 85. The second spring stopper 88 is shaped into a ring having a constricted outer surface in the same manner as the first spring stopper 86. An end of a coil spring 89 is engaged with the first spring stopper 86 of the optical semiconductor unit 21, and another end of the coil spring 89 is engaged with the second spring stopper 86 of the L-shaped plate. As a result, the optical semiconductor unit 21 is supported by the L-shaped plate 85 via the coil spring 89.

The leads of the optical semiconductor unit 40 pass through a hole 85 (FIG. 13C) formed on the L-shaped plate 85, and are connected to the printed circuit board 140 via the FPC. The first and second spring stoppers 86 and 88 prevent the coil spring 89 from contacting the leads of the optical semiconductor unit 21.

A description will now be given, with reference to FIG. 14, of another example of a method of mounting a leaf spring (corresponding to the leaf spring 25 shown in FIGS. 2 and 3A) for the optical semiconductor unit 21.

Figure 14:
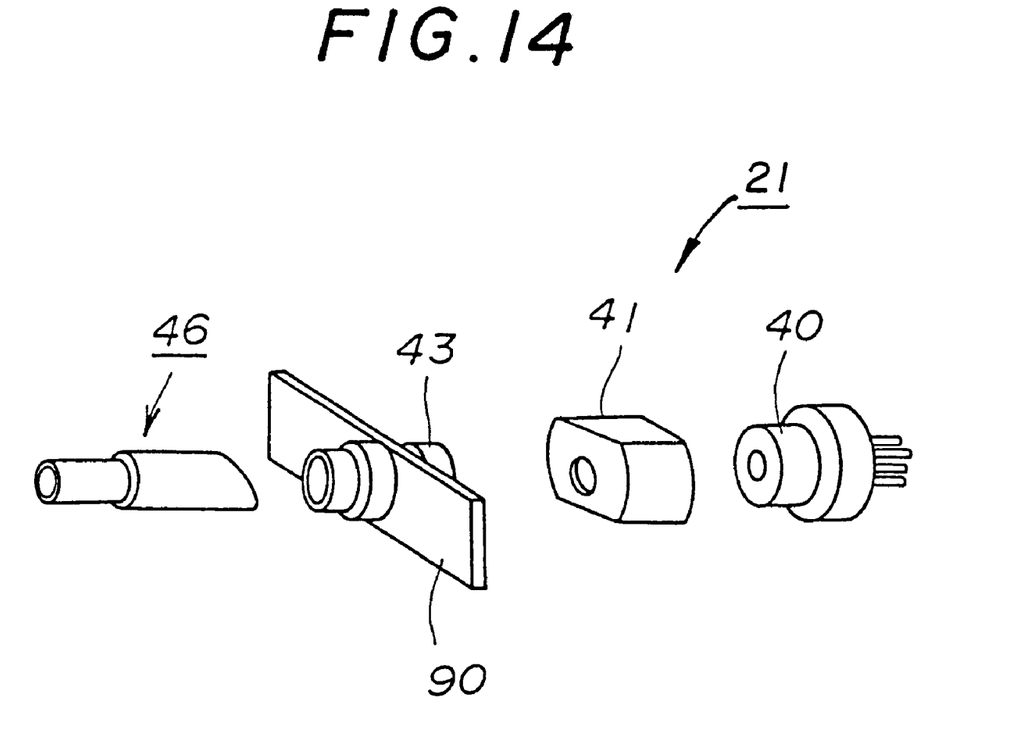
FIG. 14 is an exploded perspective view illustrating the optical semiconductor unit assembled with a leaf spring.

Referring to FIG. 14, a leaf spring 90 is arranged such that surfaces of the leaf spring 90 are perpendicular to an axis of the optical semiconductor unit 21 formed of the package 40, the holder 41, the sleeve 43 and the ferrule assembly 46. The leaf spring 90 is fixed on one of the package 40, the holder 41, the sleeve 43 and the ferrule assembly 46, for example, the sleeve 43. As a result, the leaf spring 90 functions in the same manner as the leaf spring 25 shown in FIGS. 2 and 3A.

Figure 15A:
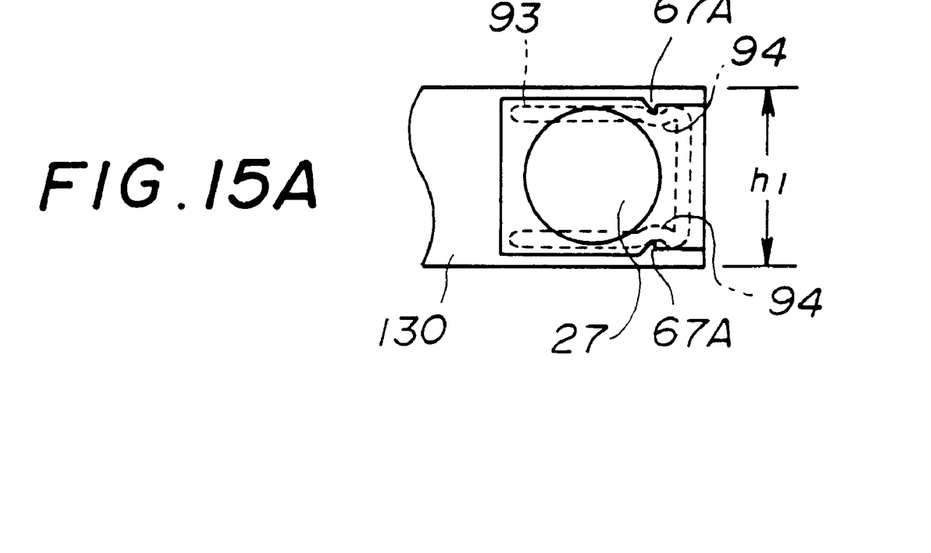
FIGS. 15A and 15B are diagrams illustrating examples of structures in which the optical connector is locked by a U-shaped pin.
Figure 15B:
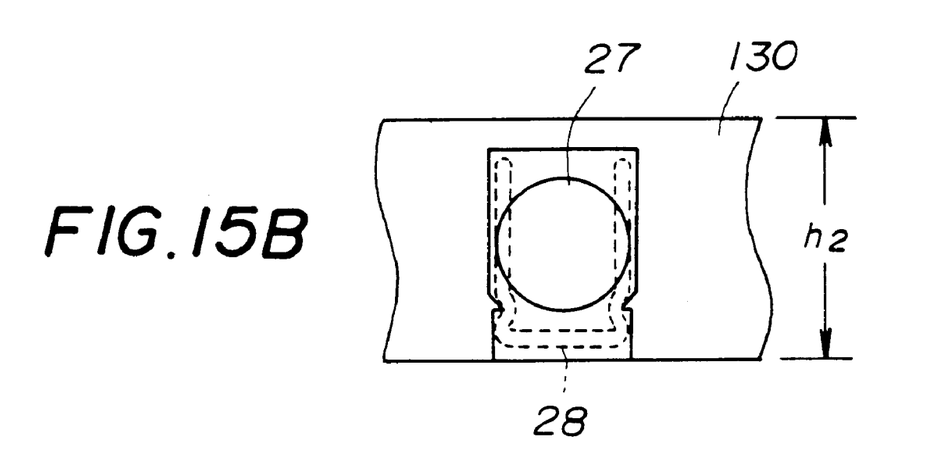

A pin used to fix the optical connector in the module case 130 may be formed as shown in FIG. 15A and FIG. 15B.

Referring to FIG. 15A, a U-shaped pin 93 is provided sideways in the module case 130 so as to prevent the optical connector 27 from being pulled out of the module case 130. In this case, the height (h1) of the module case 130 can be smaller than the height (h2) of the module case 130 in which the U-shaped pin 28 is provided lengthwise as shown in FIG. 15B (in the case shown in FIGS. 7A and 7B).

In FIG. 15A, projection portions 67A are formed in the module case 130 so as to be engaged with the bent portions 94 of the U-shaped pin 90 provided sideways in the module case 130, in the same manner as in the case shown in FIGS. 7A and 7B.

Figure 16A:
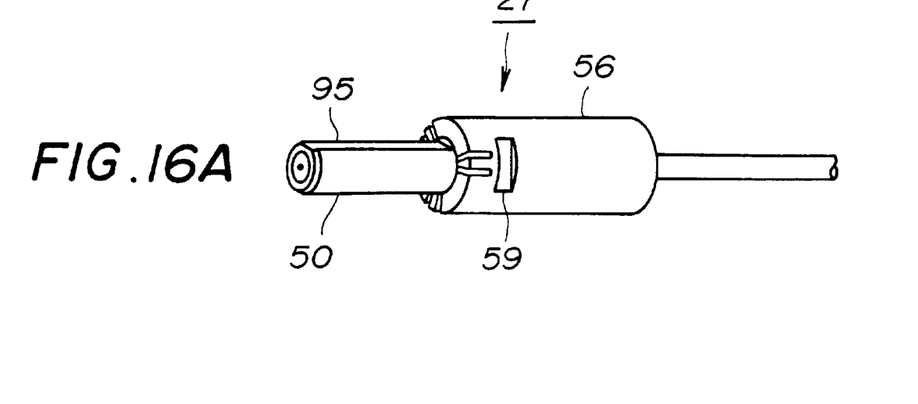
FIGS. 16A, 16B and 16C are diagrams illustrating a structure of the optical connector and the module case with the optical connector inserted therein.
Figure 16B:
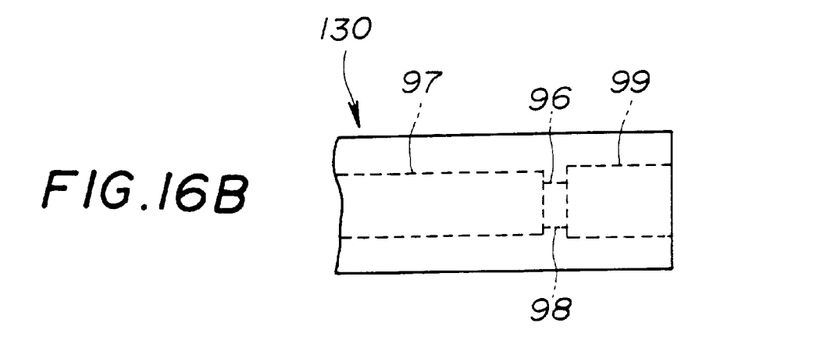
Figure 16C:
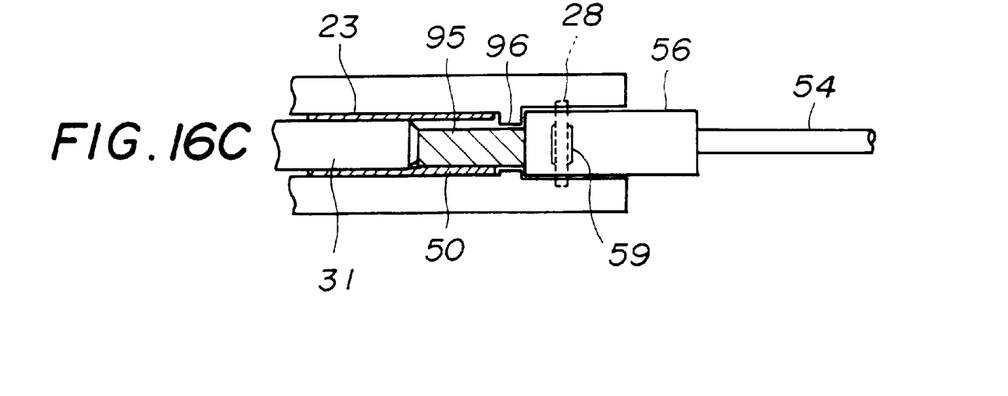

A structure for preventing the ferrule of the optical connector, as inserted in the module body 130, from being rotated may be formed as shown in FIGS. 16A, 16B and 16C.

As shown in FIG. 16A, a flat surface 95 is formed on the ferrule 50 of the optical connector 27. The flat surface is parallel to the axis of the optical connector 27. As shown in FIG. 16B, a space 97 in which the slit sleeve 23 should be mounted, a space 98 in which the ferrule 50 should be mounted and a space 99 in which the cylinder 56 should be mounted are formed in the module case 130 (constituted of the upper and lower module cases 130A and 130B). The spaces 97 and 99 are surrounded by cylindrical surfaces having inner diameters corresponding to the outer diameters of the slit sleeve 23 and cylinder 56. The space 98 is surrounded by a part of a cylindrical surface having an inner diameter corresponding to the outer diameter of the ferrule 50 and a flat surface 96 corresponding to the flat surface 95 of the ferrule 50 shown in FIG. 16A.

The optical connector 27 is inserted into the module case 130, the cylinder 56 passes through the space 99, and the leading end of the cylinder 56 hits on the border portion between the spaces 99 and 98. In this state, the pin 28 is engaged with the grooves 59 of the cylinder 56, so that the optical connector 27 is locked in the module case 130. The end of the ferrule 50 of the optical connector 27 is in contact with the end of the ferrule 31 of the optical semiconductor unit 21. The PC contact between the ferrules 50 and 31 is maintained by the repulsion force of a spring applied to the optical semiconductor unit 21.

In this state, the flat surface of the ferrule 50 and the flat surface 96 for the space 98 are fitted on each other. Thus, even if the cylinder 56 and/or the optical fiber 57 are rotated, the ferrule 50 is not rotated. As a result, the end surfaces of the ferrules 50 and 31 which are in contact with each other are prevented from being damaged by the rotation of the ferrule 50 of the optical connector 27.

The ferrule 50 and the cylinder 56 may have the same diameter and the inner diameters of the spaces 97 and 99 may be equal to each other. In this case, a part of the leading end surface of the cylinder 56, which part is exposed by the flat surface 95 of the ferrule 50, hits on the border portion between the spaces 99 and 98 so as to be prevented from being further inserted into the module case 130.

The present invention is not limited to the aforementioned embodiments, and other variations and modifications may be made without departing from the scope of the claimed invention.

What is claimed is:

1. An optical connector connectable to an optical module which supports therein an optical device and a circuit unit electrically connected to said optical device, an end of an optical fiber of said optical connector, when connected to said optical module, being in contact with said optical device, said optical connector comprising:

a fixing unit in which the optical fiber is fixed, said optical fiber extending from an end surface of said fixing unit and having an exposed end surface; and a rotatable unit joined to said fixing unit and rotatable coaxially relatively to said fixing unit and having a groove on a surface thereof extending in a direction perpendicular to a direction of insertion of said optical connector into said optical module for bringing the exposed end of said optical fiber into contact with said optical device, the groove being engagable with a pin mounted in said optical module so that said optical connector is locked in said optical module, the pin being released from the groove by rotating said rotatable unit thereby to detach said optical connector from said module.

2. An optical connector for assembly with an optical module adapted for holding an optical device, comprising:

a fixing unit in which an optical fiber is fixed, said optical fiber extending from an end surface of said fixing unit and having an exposed end exposed surface; and a rotatable unit joined to said fixing unit and rotatable coaxially relatively to said fixing unit and having a groove on a surface thereof extending in a direction perpendicular to a direction of insertion of said optical connector into said optical module for bringing the exposed end of said optical fiber into contact with an optical device held by the optical module, the groove being engagable with a pin mounted in said optical module so that said optical connector is locked in said optical module, the pin being released from the groove by rotating said rotatable unit thereby to detach said optical connector from said optical module.

* * * * *

UNITED STATES PATENT AND TRADEMARK OFFICE
CERTIFICATE OF CORRECTION

PATENT NO. : 6,086,265
DATED : July 11, 2000
INVENTOR(S) : Masaki Kuribayashi et al.

It is certified that error appears in the above-identified patent and that said Letters Patent is hereby corrected as shown below:

Title page,
Add block --[30] Foreign Application Priority Data Japanese Application No. 8-102194 April 24, 1996--.

Signed and Sealed this

Seventh Day of August, 2001

Attest:

*Attesting Officer*

NICHOLAS P. GODICI
*Acting Director of the United States Patent and Trademark Office*